United States Patent
Leahy

(10) Patent No.: US 6,308,927 B1
(45) Date of Patent: Oct. 30, 2001

(54) BREAKAWAY SIGN POST CONNECTOR

(76) Inventor: Lawrence E. Leahy, 1034 W. Adams, Auburn, IL (US) 62615

( * ) Notice: Subject to any disclaimer, the term of this patent is extended or adjusted under 35 U.S.C. 154(b) by 0 days.

(21) Appl. No.: 09/309,845

(22) Filed: May 11, 1999

(51) Int. Cl.[7] .................................................. F16M 13/00
(52) U.S. Cl. ............................ 248/548; 248/530; 403/2
(58) Field of Search ................................ 248/511, 548, 248/530, 519, 156, 909, 638; 403/2, 327, 300, 363; 411/3, 4, 5, 389, 546; 256/13.1; 174/152

(56) References Cited

U.S. PATENT DOCUMENTS

| | | | |
|---|---|---|---|
| 776,251 | * 11/1904 | Mendenhall | 248/638 |
| 1,763,682 | * 6/1930 | Wallace | 248/638 |
| 1,926,925 | * 9/1933 | Wescott | 403/296 |
| 2,915,265 | * 12/1959 | Tiger | 248/575 |
| 3,018,990 | * 1/1962 | Muller | 248/605 |
| 3,083,796 | * 4/1963 | Bell, Jr. | 403/388 |
| 3,499,630 | * 3/1970 | Dashio | 256/13.1 |
| 3,521,413 | * 7/1970 | Scott et al. | 52/98 |
| 3,637,244 | * 1/1972 | Strizki | 52/98 |
| 3,837,752 | * 9/1974 | Shewchuk | 403/2 |
| 3,951,556 | * 4/1976 | Strizki | 403/2 |
| 3,967,906 | * 7/1976 | Strizki | 403/2 |
| 3,996,065 | * 12/1976 | Trippe et al. | 429/208 |
| 4,528,786 | * 7/1985 | Dinitz et al. | 52/98 |
| 4,638,608 | * 1/1987 | Coy | 52/98 |
| 4,654,987 | * 4/1987 | Kinshofer | 37/186 |
| 4,923,319 | * 5/1990 | Dent | 403/2 |
| 5,004,366 | * 4/1991 | Simmons | 403/2 |
| 5,125,194 | * 6/1992 | Granger | 52/98 |
| 5,214,886 | * 6/1993 | Hugron | 52/98 |
| 5,474,408 | * 12/1995 | Dinitz et al. | 411/5 |
| 5,480,121 | * 1/1996 | Rice et al. | 248/548 |
| 5,596,845 | * 1/1997 | Strizki | 52/98 |
| 5,709,513 | * 1/1998 | Tsai | 411/107 |
| 5,855,443 | * 1/1999 | Faller et al. | 403/2 |
| 6,056,471 | * 5/2000 | Dinitz | 403/2 |
| 6,076,794 | * 6/2000 | Pradel | 248/562 |
| 6,095,481 | * 8/2000 | Norkus et al. | 248/560 |
| 6,113,055 | * 9/2000 | Salman | 248/548 |
| 6,116,833 | * 9/2000 | Ellis | 411/384 |
| 6,210,066 | * 4/2001 | Dent | 403/2 |
| 6,216,413 | * 4/2001 | Lapointe | 52/726.3 |

* cited by examiner

Primary Examiner—Anita King
Assistant Examiner—Naschica S Morrison
(74) Attorney, Agent, or Firm—Armstrong Teasdale LLP

(57) ABSTRACT

A breakaway sign post connector includes a shear member and a bushing. The shear member includes a first end, a second end, and a necked down section intermediate the first and second ends. A shoulder is attached to the second end, and a resilient bushing is positioned over the shoulder and surrounds the shear member. When attached to an anchor plate and a support plate for a sign post, the bushing strengthens the connector and resists wind shear while allowing the shear member to fracture in the necked down section at a predetermined impact load.

24 Claims, 4 Drawing Sheets

BREAKAWAY SIGN POST CONNECTOR

BACKGROUND OF THE INVENTION

This invention relates generally to sign posts and, more particularly, to break away sign posts for signs adjacent to roadways.

A roadway sign typically includes an anchor that is driven into the ground, an extended support connected to the anchor and extending above the ground, and a sign attached to the support. Due to their proximity to the roadway, road signs may be a hazard for errant vehicles.

The Federal Highways Administration ("FHWA") has promulgated yielding criteria for sign posts and structures located adjacent to designated traffic areas both to protect the occupants of vehicles and to reduce property damage from collisions with these structures. For small and intermediate roadside supports, the FHWA standards required a structure weak enough to bend upon impact and allow a vehicle to pass over the support structure with minimum deceleration. Thus, occupant interior impact could be avoided and vehicular damage could be minimized. After a collision, however, the entire roadway sign support needs to be replaced, including the anchor in many cases.

To avoid the cost of replacing the anchors after a collision, sign posts have been designed in which the sign support shears from the anchor upon impact so that the anchor may subsequently be reused with a replacement support after a collision. Couplers machined or cast with predetermined break points, such as shear bolts, have been employed with some success to separate the sign support and the anchor so that the anchor is undamaged when a vehicle collides with a sign post. However, the couplers are vulnerable to shearing from wind loads on a sign.

Accordingly, it would be desirable to provide a breakaway connector strong enough to withstand a given wind load allowing it to break or release upon impact within allowable FHWA criteria for vehicle deceleration.

BRIEF SUMMARY OF THE INVENTION

In an exemplary embodiment of the invention, a sign post assembly comprises an anchor member, a breakaway connector, and a support member. The anchor member includes a ground member that is driven into the ground, and an anchor plate attached to an end of the ground member above the surface of the ground. The anchor plate has a threaded opening therethrough.

The breakaway connector includes a shear member and a bushing. The shear member includes a first threaded end and a second threaded end. A necked down portion of smaller cross sectional area extends between the first and second ends. The necked down portion includes flat sides so that the shear member may be gripped with a wrench when erecting a sign or for removal after impact. The first end is threaded into the opening in the anchor plate and attached thereto. The second end of the shear member includes a shoulder and an engagement surface. The bushing is made of rubber, surrounds the shoulder, and spans the necked down portion of the shear member.

The support member includes a sign support and a support plate. The support plate has an aperture therethrough. The second end of the shear member extends through the aperture and is attached to the support plate. The support plate rests on the shoulder of the shear member and the bushing is compressed between the support plate and the anchor plate.

The shear member fractures at a desired location in the necked down portion within FHWA guidelines and while withstanding required wind loads. The bushing surrounding the shear member spreads the wind bearing load over an appreciably greater area than the necked down portion of the shear member but allows the shear member to break away within FHWA standards.

Thus, the break away sign support allows the sign support to survive a strong wind, and the anchor to survive a strong collision. In addition, considerable time and money are saved since the anchor does not need to be replaced. Rather, another sign may be quickly erected after a collision by simply replacing the shear member and the sign support.

DETAILED DESCRIPTION OF THE INVENTION

Figure 1:
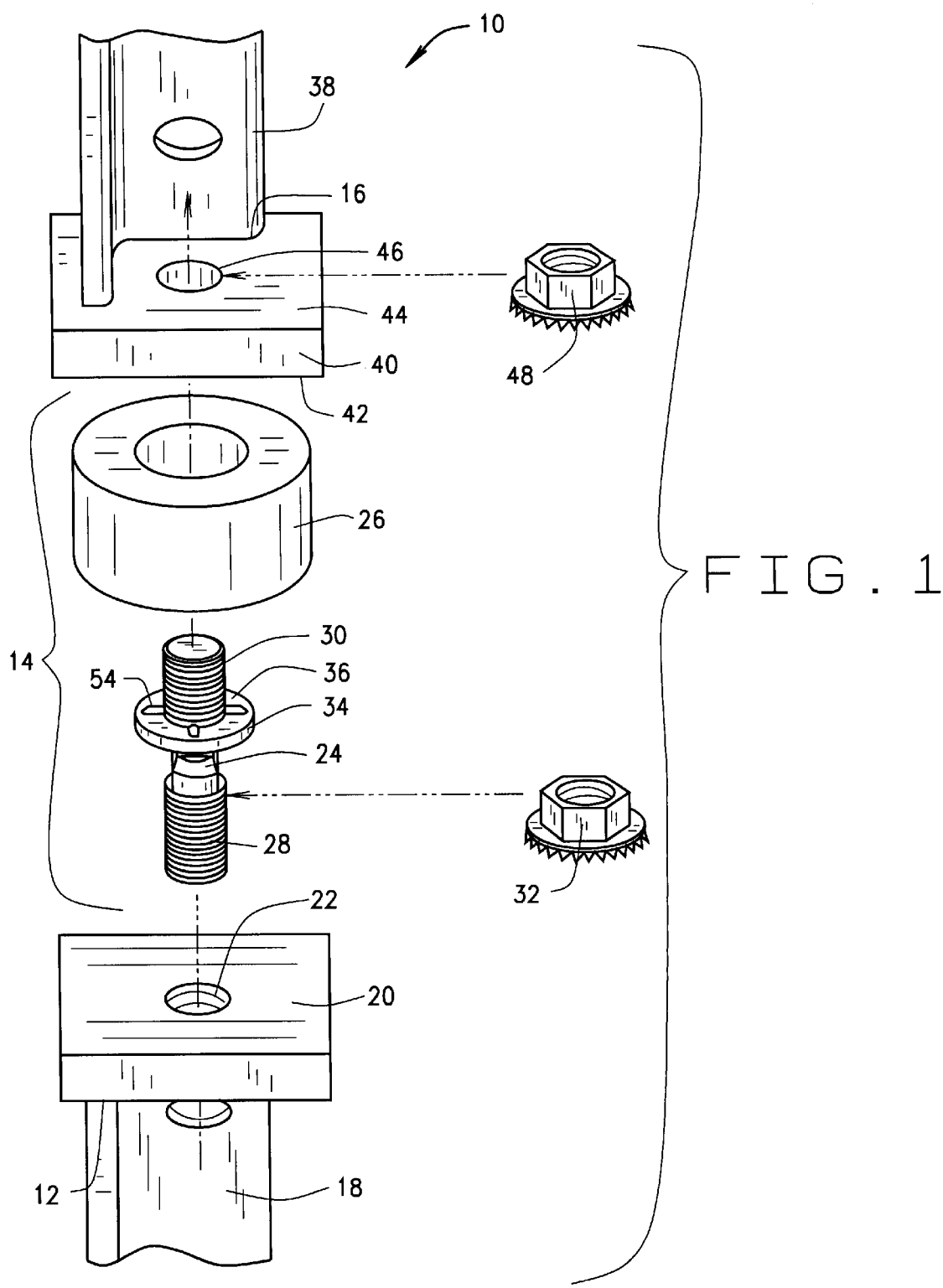
FIG. 1 is an exploded view of a breakaway sign post assembly.

FIG. 1 is an exploded view of a breakaway sign post assembly 10 including an anchor member 12, a breakaway connector 14, and a support member 16. The breakaway connector 14 allows the support member 16 to shear from the anchor portion 12 upon vehicular impact while preventing shearing from heavy wind loads.

Anchor member 12 includes a ground anchor connector 18 and an anchor plate 20. Ground anchor connector 18 is elongated and attached to anchor plate 20. Anchor plate 20 is substantially perpendicular to ground anchor connector 18. Ground anchor connector 18 has an L-shaped cross section. Alternatively, a variety of other shapes of ground members could be used, including but not limited to square, round, U-channel or flanged beam cross sections.

Anchor plate 20 is substantially square and includes a threaded opening 22 therethrough. Anchor plate 20 may be welded, bolted or otherwise attached to ground anchor connector 18, and may be shaped to accommodate ground members 18 of various sizes and shapes. In addition, anchor plate 20 could have multiple openings 22.

Breakaway connector 14 includes a shear member 24 and a bushing 26. Shear member 24 includes a first threaded end 28 and a second threaded end 30. First end 28 is threaded through anchor plate opening 22 and is secured to anchor plate 20 with a first flanged, serrated nut 32. Second end 30 of shear member 24 includes a shoulder 34. Shoulder 34 is substantially circular and has an outer radius and a top surface 36.

Bushing 26 is inserted over and substantially surrounds shear member 24. Bushing 26 is made of high density rubber, or another resilient material, and is substantially cylindrical. In an exemplary embodiment, bushing 26 has a durometer of about 70. Bushing 26 has an inner radius substantially equal to the outer radius of shoulder 34 and first flange nut, thereby having a slight intentional interference fit with shoulder 34 and flange nut 32. In an alternative embodiment, bushing 26 and shoulder 34 could have other complementary shapes.

Support member 16 includes a sign support 38 and a support plate 40. Sign support 38 is elongated and attached to support plate 40. Support plate 40 is substantially perpendicular to sign support 38. Sign support 38 has an L-shaped cross section. Alternatively, a variety of other shapes of support members could be used, including, but not limited to, square, round, U-channel or flanged beam cross sections.

Support plate 40 includes a first side 42, a second side 44 and an aperture 46 therethrough. Support plate 40 is substantially square and welded, bolted or otherwise attached to sign support connector 38. Support plate 40 may be shaped to accommodate sign support members of various sizes and shapes and different support configurations. In addition, support plate 40 could include multiple openings.

Second end 30 of shear member 24 extends through support plate aperture 46 and support plate 40 is attached to second end 30 with a second flanged serrated nut 48. Top surface 36 of shoulder 34 contacts first side 42 of support plate 40 and engages first side 42 with a biting action as second flanged nut 48 is tightened. Thus, support plate 40 is retained between shoulder 34 and second flanged nut 48.

Figure 2:
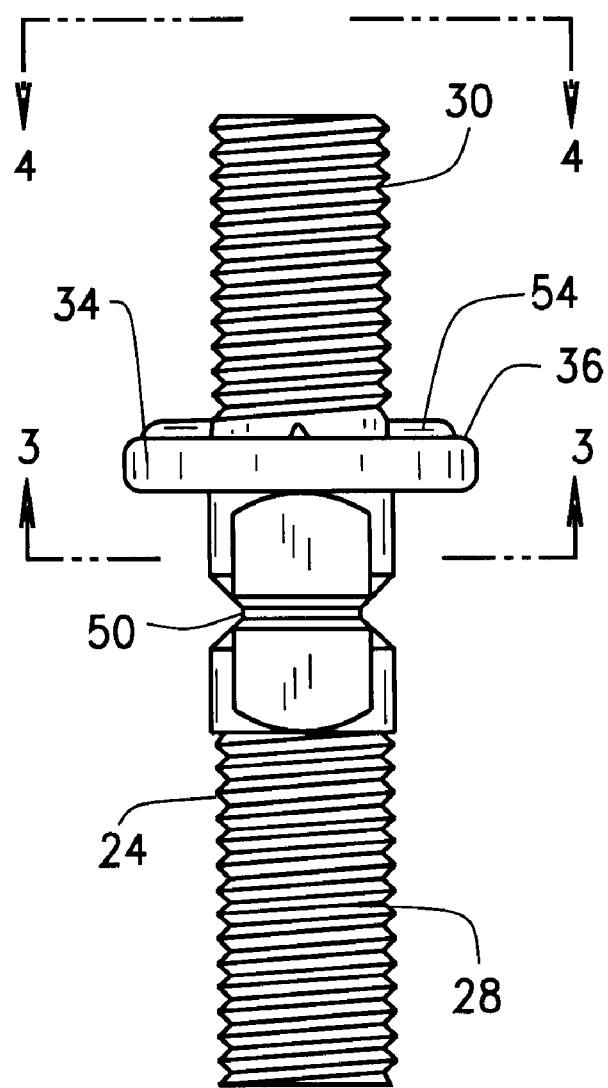
FIG. 2 is an elevational view of a shear member according to FIG. 1

FIG. 2 is an elevational view of shear member 24. Shear member 24 includes a necked down section 50 at an approximate middle of shear member 24 between first end 28 and second end 30. Necked down section 50 has a gradually decreasing diameter relative to first end 28 and second end 30, forming a generally V-shaped profile with an apex. Necked down section 50 has a minimum diameter at the apex that corresponds to a predetermined fracture load, and a maximum diameter approximately equal to the diameter of first end 28 and second end 30.

Figure 3:
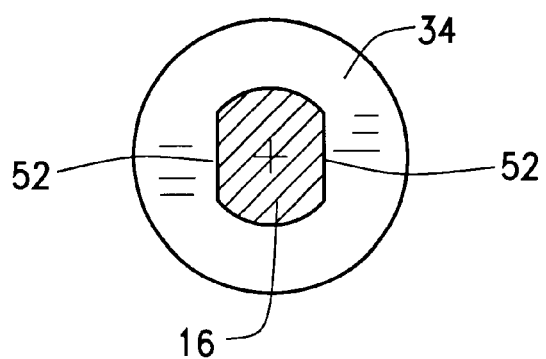
FIG. 3 is a cross-sectional view of the shear member shown in FIG. 2 along line 3—3.

FIG. 3 is a cross sectional view of shear member 24 illustrating a pair of flat sides 52. Flat sides 52 extend above and below necked down section 50 to allow shear member 24 to be manipulated with standard tools, such as a wrench, during attachment to anchor plate 20 and support plate 40. Flat sides 52 do not affect the breaking of shear member 24 by impact, since they are positioned to be substantially parallel to a line of impact from a collision.

Figure 4:
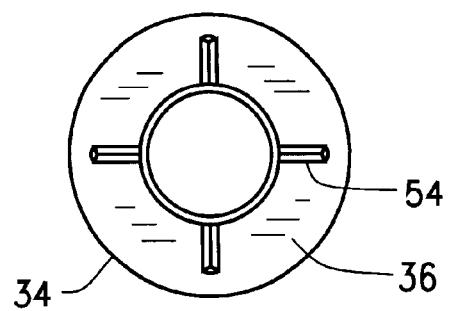
FIG. 4 is a top plan view of the shear member shown in FIG. 2 along line 4—4.

FIG. 4 is a top view of shear member 24 illustrating a plurality of ribs 54 on top surface 36 of shoulder 34. Ribs 54 are triangular in shape and extend radially along top surface 36 of shoulder 34. Ribs 54 engage first side 42 of support plate 40 (shown in FIG. 1) with a gripping action.

Figure 5:
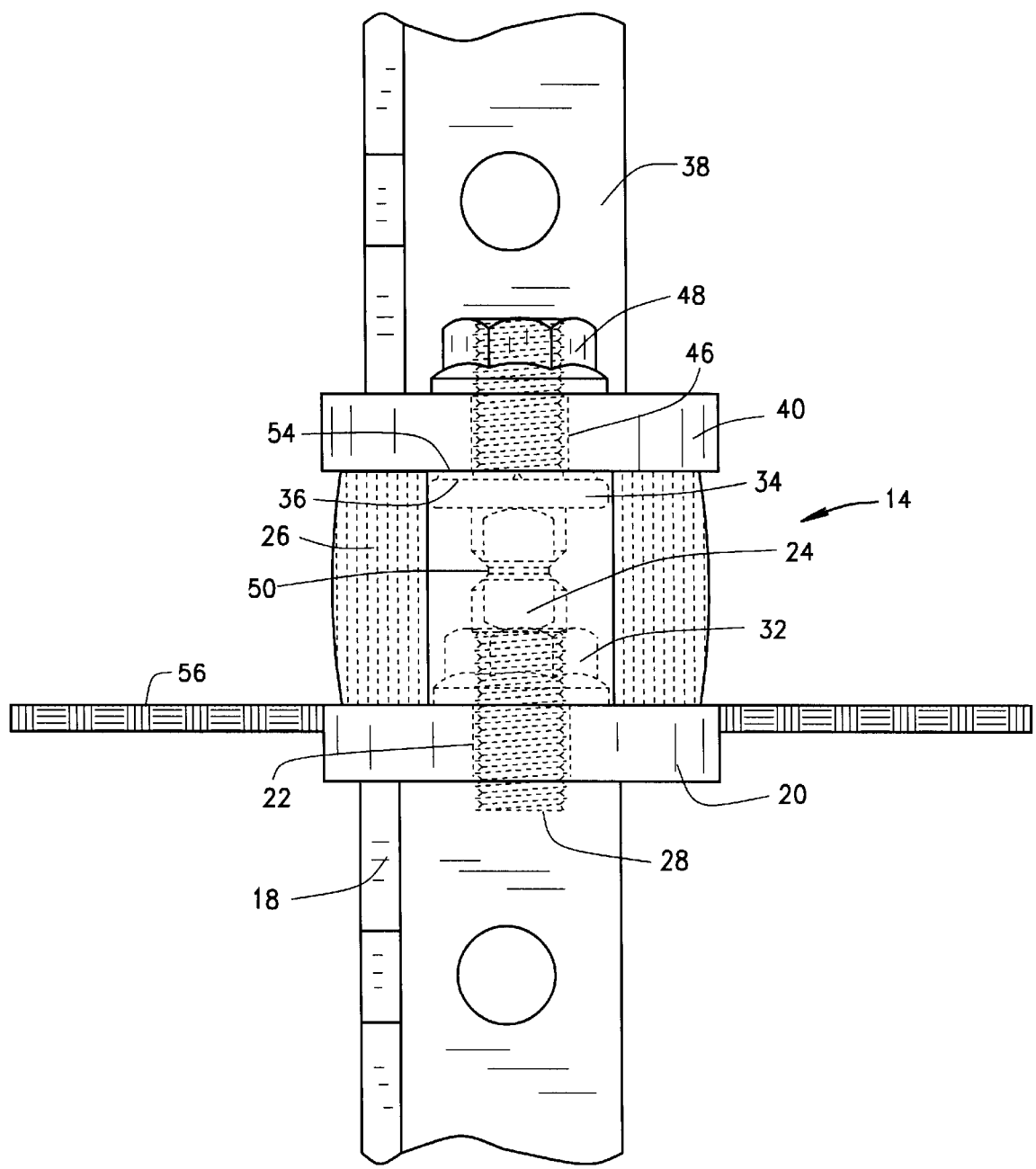
FIG. 5 is an elevational view of the breakaway sign post assembly shown in FIG. 1.

FIG. 5 illustrates an assembled sign post assembly 10. Sign post assembly 10 is assembled by placing ground anchor connector 18 into the ground anchor by bolting or welding. In addition, ground anchor connector 18 and corresponding anchor may be anchored to the ground according to methods well known in the art, such as using concrete to stabilize ground anchor connector 18 and prevent shifting of anchor member 12. Anchor plate 20 is substantially flush with the ground. In an alternative embodiment, anchor plate 20 extends slightly above the ground. Anchor plate 20 is generally level and perpendicular to ground anchor connector 18.

First end 28 of shear member 24 is threaded into anchor plate 20 through opening 22 until anchor plate 20 contacts first flanged nut 32. First flanged nut 32 is then torqued against anchor plate 20 to create a double nut lock. Rubber bushing 26 is positioned adjacent the top surface (not shown) of shoulder 34 and is then slid over shear member 24 and shoulder 34 until bushing 26 rests on anchor plate 20. Second end 30 of shear member 24 is then inserted through aperture 46 in support plate 40 until support plate 40 contacts ribs 54 of shoulder top surface 36 and contacts bushing 26. Second flanged nut 48 is then attached to second end 30 and tightened until bushing 26 is slightly bulged or compressed between anchor plate 20 and support plate 40.

Bushing 26 surrounds shear member 24 and spreads the wind bearing load over a greater area than necked down portion 50 of shear member 24 providing greater resistance to wind shear than shear member has alone. For example, utilizing bushing 26 having a 2 inch outer diameter and a 1 inch inner diameter with shear member 24 having a minimum necked down section diameter of 0.3 inches spreads a wind bearing load over an area approximately 44 times greater than the necked down section at its minimum diameter. Rubber bushing 26, however, still allows shear member 24 to shear in compliance with FWHA standards.

Multiple connectors 14 could be used for large signs and signal structures. In addition, if anchor plates 20 and support plates 40 have multiple openings 22 and apertures 46, connector 14 could be inserted through different openings and apertures in the respective plates to change the relative orientation of sign support 38 relative to ground anchor connector 18.

While the invention has been described in terms of various specific embodiments, those skilled in the art will recognize that the invention can be practiced with modification within the spirit and scope of the claims.

What is claimed is:

1. A break away sign post connector for attaching a sign support member to an anchor member, said connector comprising:
    a shear member having a first end, a second end, and a necked down section between said first and second ends; and
    a bushing surrounding said shear member and supporting said necked-down section.

2. A connector in accordance with claim 1 wherein said shear member comprises a bolt.

3. A connector in accordance with claim 2 wherein said bolt further comprises at least one flat side extending through said necked-down section.

4. A connector in accordance with claim 1 wherein said shear member further comprises a shoulder attached to one of said first end and said second end.

5. A connector in accordance with claim 4 wherein said shoulder comprises an annular shoulder having an outer diameter, said bushing including an inner diameter, said bushing inner diameter and said annular shoulder outer diameter substantially equal.

6. A connector in accordance with claim 5 wherein said bushing comprises rubber.

7. A connector in accordance with claim 4 wherein said annular shoulder comprises a top surface including a plurality of ribs, said top surface configured to engage a support member.

8. A breakaway sign post assembly comprising:
    an anchor member comprising an anchor plate and a ground member, said anchor plate connected to said ground member, said anchor plate including a threaded opening;
    a shear bolt comprising a threaded first end, a second end, and a necked down section, said necked down section separating said first end and said second end, said first end engaging said opening, said second end comprising a shoulder;
    a bushing surrounding said bolt and said shoulder, said bushing contacting said anchor plate; and a support member contacting said bushing and attached to said bolt at said bolt second end.

9. An assembly in accordance with claim 8 wherein said support member comprises a support plate and a sign support, said support plate connected to said sign support, said support plate including an aperture, said second end of said bolt extending through said aperture.

10. An assembly in accordance with claim 8 wherein said shoulder further comprises an engagement surface, said engagement surface engaging said support plate.

11. An assembly in accordance with claim 10 wherein said engagement surface includes at least one rib.

12. An assembly in accordance with claim 8 further comprising first and second flanged nuts, said first flanged nut connecting said anchor plate and said bolt, said second flanged nut connecting said support plate and said shoulder.

13. An assembly in accordance with claim 8 wherein said bushing is compressed between said anchor plate and said support plate.

14. An assembly in accordance with claim 8 wherein said bolt further comprises at least one flat side extending through said necked-down section.

15. A method for assembling a breakaway sign post, said sign post including an anchor member, a support member, a shear member and a bushing, the anchor member including an anchor plate and a ground member, the anchor plate connected to said ground member and having an opening therethrough, the support member including a support plate and a sign support, the support plate connected to the sign support and having an aperture therethrough, the shear member including a necked down section between a first end and a second end, the second end comprising a shoulder, said method comprising the steps of:

anchoring the ground member;

extending the first end of the shear member through the opening of the anchor plate;

attaching the shear member to the anchor plate;

inserting the bushing over the shear member;

inserting the second end of the shear member through the support plate; and attaching the shear member to the support plate.

16. A method in accordance with claim 15 wherein the shear member is a bolt and the sign post further includes a flanged nut, said step of attaching the shear member to the anchor plate comprises the steps of:

threading the flanged nut onto the first end of the bolt; and tightening the nut to the anchor plate.

17. A method in accordance with claim 16 wherein the bolt further includes opposite flat sides extending through the necked down section, said step of tightening the first flanged nut to the anchor plate comprises the steps of:

gripping the flat sides of the necked down section with a wrench; and holding the flat sides stationary while rotating the nut.

18. A method in accordance with claim 15 wherein the shear member is a bolt, the sign post further including a flanged nut, said step of attaching the shear member to the support plate comprises the steps of:

threading the flanged nut onto the second end of the bolt; and tightening the nut to the support plate.

19. A method in accordance with claim 15 further comprising the step of compressing the bushing between the anchor plate and the support plate.

20. A method in accordance with claim 18 wherein the opening through the anchor plate is threaded, the step of extending the first end of the shear member through the opening further comprises the step of threading the bolt through the threaded opening.

21. A connector in accordance with claim 1 wherein said bushing is substantially cylindrical.

22. A connector in accordance with claim 1 wherein said necked-down section has a maximum diameter approximately equal in diameter to said first end and said second end.

23. An assembly in accordance with claim 8 wherein said bushing is substantially cylindrical.

24. An assembly in accordance with claim 8 wherein said necked-down section has a maximum diameter approximately equal in diameter to said first end and said second end.

* * * * *